(12) United States Patent
Higuchi (10) Patent No.: US 7,441,217 B2
(45) Date of Patent: Oct. 21, 2008

(54) METHOD AND APPARATUS FOR CREATING SIMPLIFIED FALSE-PATH DESCRIPTION ON FALSE PATH, AND COMPUTER PRODUCT

(75) Inventor: Hiroyuki Higuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 268 days.

(21) Appl. No.: 11/521,148

(22) Filed: Sep. 14, 2006

(65) Prior Publication Data
US 2007/0220457 A1 Sep. 20, 2007

(30) Foreign Application Priority Data
Mar. 2, 2006 (JP) ............................. 2006-056447

(51) Int. Cl.
*G06F 17/50* (2006.01)
(52) U.S. Cl. ......................................... 716/6
(58) Field of Classification Search ................ 716/2, 716/4, 6, 12
See application file for complete search history.

(56) References Cited
U.S. PATENT DOCUMENTS
6,714,902 B1 3/2004 Chao et al.
7,398,424 B2 * 7/2008 Higuchi ........................ 714/30
2002/0112213 A1 * 8/2002 Abadir et al. ................... 716/4
2006/0123370 A1 * 6/2006 Vergara-Escobar ............. 716/6

FOREIGN PATENT DOCUMENTS
JP 2001-067383 3/2001
JP 2003-526149 9/2003
JP 2005-149373 6/2005

* cited by examiner

*Primary Examiner*—Stacy A Whitmore
(74) *Attorney, Agent, or Firm*—Greer, Burns & Crain, Ltd.

(57) ABSTRACT

An apparatus for creating a simplified false-path description on a false path among paths in a target circuit extracts, from descriptions on the paths, a target path description on a target path. The apparatus judges whether the target path is a false path based on the target path description. The apparatus identifies, when it is judged that the target path is a false path, a sufficient set of elements from elements included in the target path. The settings for causing every element in the sufficient set to transmit a signal conflict. The apparatus creates the simplified false-path description on the false path by deleting, from the target path description, a description on elements that are not included in the sufficient set.

12 Claims, 11 Drawing Sheets

210 set_false_path -through G1.A -through G2.A -through G3.A -through G4.A -through G5.A

| TARGET PATH | SIMPLIFIED DESCRIPTION |
|---|---|
| I2-G11-G12-G18-G13-G14-G15-O1 | (G11.D1,G13.D1)<br>(G13.D1,G15.D1) |
| I2-G11-G12-G18-G13-G14-O2 | (G11.D1,G13.D1) |
| ⋮ | ⋮ |

METHOD AND APPARATUS FOR CREATING SIMPLIFIED FALSE-PATH DESCRIPTION ON FALSE PATH, AND COMPUTER PRODUCT

CROSS-REFERENCE TO RELATED APPLICATIONS

This application is based upon and claims the benefit of priority from the prior Japanese Patent Application No. 2006-056447, filed on Mar. 2, 2006, the entire contents of which are incorporated herein by reference.

BACKGROUND OF THE INVENTION

1. Field of the Invention

The present invention relates to a technology for creating a simplified false-path description on a false path detected in a target circuit.

2. Description of the Related Art

In designing a circuit of a semiconductor device such as a large scale integration (LSI), a timing analysis is executed to estimate circuit delay and to check whether the estimated circuit delay is within a range of delay that is necessary for the normal operation of a target circuit included in the LSI or a part of the LSI. This timing analysis is an indispensable step for securing a designed circuit to operate accurately and for optimizing a clock operation, and not only a netlist of the target circuit but also a description on a timing exception (such as a false path), etc., are necessary.

Figure 10:
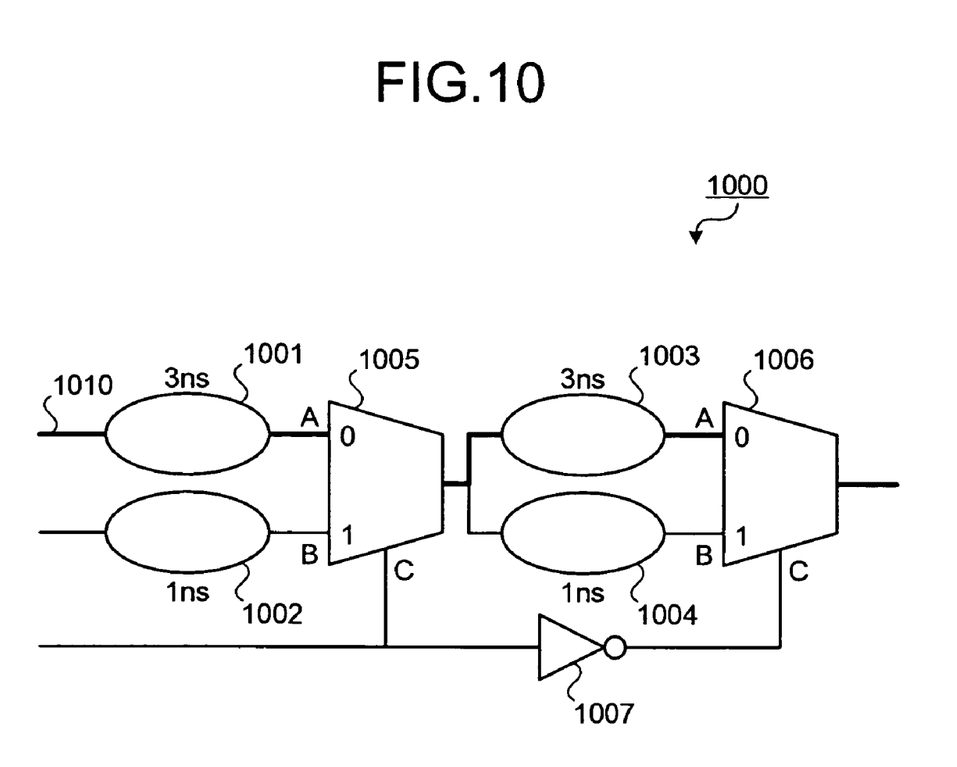
FIG. 10 is a schematic of a false path in a target circuit.

FIG. 10 is a schematic of a false path in a target circuit. A target circuit 1000 includes combinational circuits 1001, 1002, 1003, and 1004, multiplexers 1005 and 1006, and a NOT gate 1007.

Each of the combinational circuits 1001, 1002, 1003, and 1004 is a circuit formed by combining logic circuits. The combinational circuits 1001, 1003 are circuits that need a processing time period of 3 nanoseconds (ns), respectively. The combinational circuits 1002, 1004 are circuits that need a processing time period of 1 ns, respectively.

The multiplexers 1005, 1006 switch paths based on an input signal. Specifically, each of the multiplexers causes a path from an input A to pass through when an input signal from an input C is "0", and causes a path from an input B to pass through when the input signal from the input C is "1". The NOT gate 1007 is a logic gate that inverts an input signal. Specifically, the NOT gate 1007 sets an output signal of "1" when an input signal is "0", and sets an output signal of "0" when an input signal is "1".

A target path 1010 indicated by a thick line in the target circuit 1000 is a false path on which no combination of inputs for transmitting a signal is present. Specifically, the multiplexer 1005 causes the input A to pass through when an input signal from the input C in the multiplexer 1005 is "0". However, the input signal from the input C in the multiplexer 1006 becomes "1" due to the NOT gate 1007. Therefore, the multiplexer 1006 does not cause the input A to pass through.

Furthermore, when an input signal from the input C in the multiplexer 1006 is "0", the multiplexer 1006 causes the input A to pass through. However, the input signal from the input C in the multiplexer 1005 is "1" due to the NOT gate 1007. Therefore, the multiplexer 1005 does not cause the input A to pass through.

In the timing analysis of the target circuit 1000, circuit delay is estimated by detecting the false path described above. Specifically, in the target circuit 1000, the maximum processing time of 6 ns may be necessary when a signal passes through the target path 1010. However, this can be ignored because no signal transmits through the path 1010, and the circuit delay can be estimated to be 4 ns. More specifically, the processing time of 4 ns of a path passing through the combinational circuit 1001 and the combinational circuit 1004 or of a path passing through the combinational circuit 1002 and the combinational circuit 1003 is the circuit delay.

As to detection of a false path, a method of checking whether a path in a target circuit is a false path based on a satisfiablity check, has been proposed (for example, Japanese Patent Application Laid-Open Publication No. 2003-526149). A method of improving the speed of judging a false path by simplifying a pattern input to a path for the judgment has been also proposed (for example, Japanese Patent Application Laid-Open Publication No. 2001-67383).

Reduction of processing time in detecting a false path and processing time of a tool that utilizes information on detected false path by directly detecting passing points of signal lines in a target circuit has been proposed (for example, Japanese Patent Application Laid-Open Publication No. 2005-149373).

Recently, a target circuit of an LSI or a part of an LSI has become more complicated due to an increase in the number of logic gates therein. As a result, the number and the data amount of descriptions on the detected false paths become tremendous even when detection of a false path using the conventional technologies is executed.

Therefore, tremendous processing time is necessary to execute timing analyses and to execute optimization of the layout of circuit designing, etc., for each of the tremendous number of descriptions on false paths, thereby increasing a period for the designing.

Furthermore, with only the descriptions on the false paths output, check on an input signal must be executed for all the pieces of the descriptions. It increases labor of and a load on design engineers, especially when the number of the pieces of the descriptions are large or the pieces of the descriptions cause a conflict in an indirect manner.

SUMMARY OF THE INVENTION

It is an object of the present invention to at least solve the above problems in the conventional technologies.

A computer-readable recording medium according to one aspect of the present invention stores a computer program for creating a simplified false-path description on a false path among plural paths in a target circuit. The computer program causes a computer to execute extracting, judging, identifying, and creating. At the extracting, a target path description on a target path is extracted from plural descriptions on the paths. At the judging, whether the target path is a false path is judged based on the target path description. At the identifying, a sufficient set of elements is identified from plural elements included in the target path, when it is judged that the target path is a false path. Settings for causing every element in the sufficient set to transmit a signal conflict. At the creating, the simplified false-path description on the false path is created by deleting, from the target path description, descriptions on elements that are not included in the sufficient set.

An apparatus according to another aspect of the present invention creates a simplified false-path description on a false path among plural paths in a target circuit. The apparatus includes an extracting unit, a first judging unit, an identifying unit, and a creating unit. The extracting unit extracts, from plural descriptions on the paths, a target path description on a target path. The first judging unit judges whether the target path is a false path based on the target path description. The identifying unit identifies, when it is judged that the target path is a false path, a sufficient set of elements from plural elements included in the target path. Settings for causing every element in the sufficient set to transmit a signal conflict. The creating unit creates the simplified false-path description on the false path by deleting, from the target path description, a description on elements that are not included in the sufficient set.

A method according to still another aspect of the present invention is a method of creating a simplified false-path description on a false path among plural paths in a target circuit. The method includes extracting, judging, identifying, and creating. At the extracting, a target path description on a target path is extracted from plural descriptions on the paths. At the judging, whether the target path is a false path is judged based on the target path description. At the identifying, a sufficient set of elements are identified from plural elements included in the target path, when it is judged that the target path is a false path. Settings for causing every element to transmit a signal conflict. At the creating, the simplified false-path description on the false path is created by deleting, from the target path description, descriptions on the elements that are not included in the sufficient set.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Exemplary embodiments according to the present invention will be explained in detail with reference to the accompanying drawings.

Figure 1:
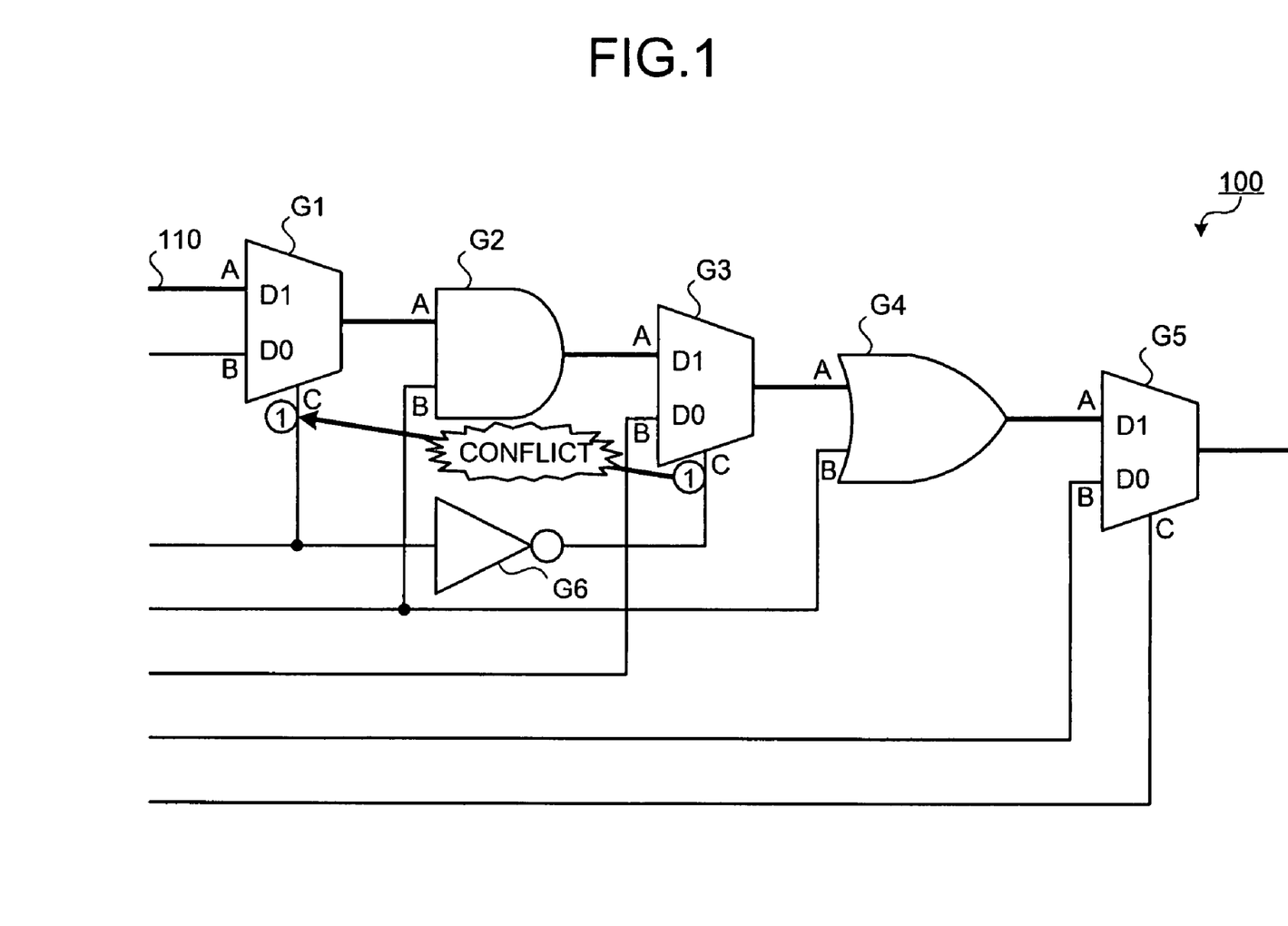
FIG. 1 is a schematic of a false path according to an embodiment of the present invention.

FIG. 1 is a schematic of a false path according to an embodiment of the present invention. A target circuit 100 includes circuit elements G1, G2, G3, G4, G5, and G6. Herein, G1, G2, . . . are respectively text information of description on a circuit element in each path.

The circuit elements G1, G3, and G5 are multiplexers shown in FIG. 10 and are elements that switch paths based on an input signal. Specifically, a path from an input A is selected to D1 when an input signal from an input C is "1", and a path from an input B is selected to D0 when an input signal from the input C is "0".

The circuit element G2 is an AND gate and is a logic gate having a function of logical multiplication. Specifically, the circuit element G2 sets an output signal of "1" to the output when input signals from the inputs A and B are both "1". In other words, the circuit element G2 sets an output signal of "0" to the output when at least any one of input signals from the input A and the input B is "0".

The circuit element G4 is an OR gate and is a logic gate having a function of logical addition. Specifically, the circuit element G4 sets an output signal of "1" to the output when at least any one of input signals from the input A and the input B is "1". In other words, the circuit element G4 sets an output signal of "0" to the output when input signals from the input A and the input B are both "0".

The circuit element G6 is a NOT gate and is a logic gate having a function as an inverter that inverts an input signal. Specifically, the circuit element G6 sets an output signal of "1" when an input signal is "0", and sets an output signal of "0" when an input signal is "1".

A target path 110 indicated by a thick line in the target circuit 100 is a false path on which no combination of inputs for transmitting a signal is present. Specifically, G1 causes the input A to pass through when an input signal from the input C of G1 is "1". However, an input signal from the input C of G3 is "0" due to G6 that is a NOT gate. Therefore, G3 does not cause the input A to pass through.

Furthermore, when an input signal from the input C of G3 is "1", G3 causes the input A to pass through. However, an input signal from the input C of G1 is "0" due to the G6 that is a NOT gate. Therefore, G1 does not cause the input A to pass through.

Thus, no combination of inputs for transmitting a signal is present for G1 and G3, and a conflict occurs to transmit the signal. In a timing analysis of the target circuit 100, the target path 110 having the conflict as described above is detected as a false path.

Figure 2A:
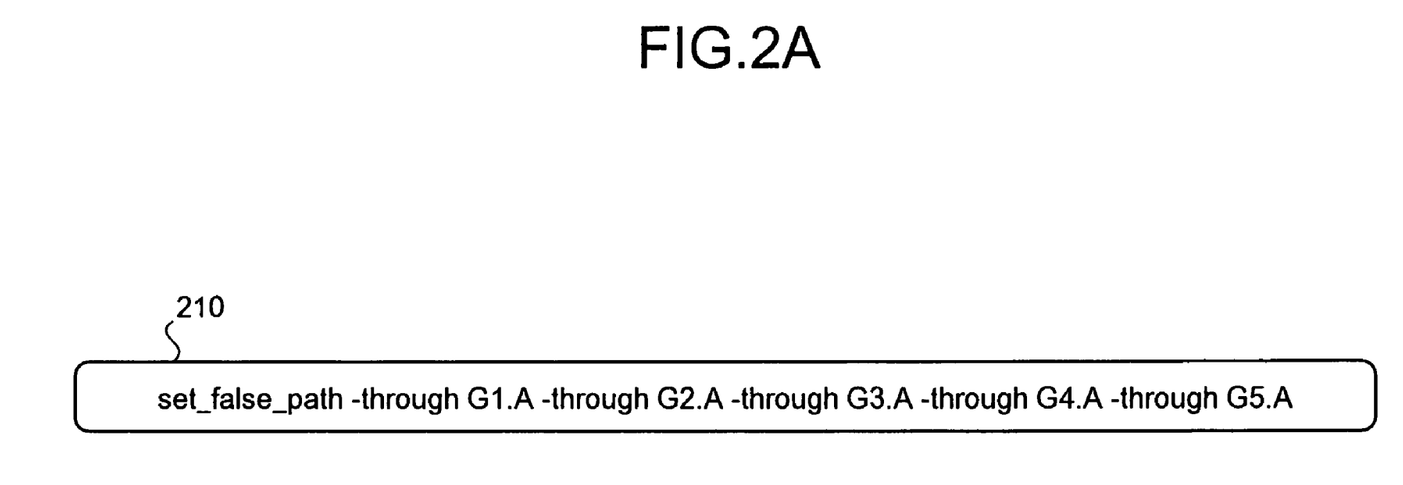
FIGS. 2A to 2C are schematics of a description on a target path detected as a false path.

FIG. 2A is a schematic of a description on a target path detected as a false path. A description 210 on the target path 110 is a description on the target path 110 shown in FIG. 1. The description 210 includes a type of the path and a description on circuit elements to pass through.

Specifically, because the target path 110 is detected as a false path, the target path 110 has a description including "set_false_path" and also has another piece of description including circuit elements to pass through and inputs of the circuit elements.

More specifically, the target path 110 has passed the input A of G1, the input A of G2, the input A of G3, the input A of G4, and the input A of G5. The description 210 includes "-through G1.A-through G2.A-through G3.A-through G4.A-through G5.A" after "set_false_path". Hereinafter, for example, "G1.A" represents a circuit element to pass through and an input of G1, and the number of circuit elements to pass through and inputs of the circuit elements is represented as "through number".

Figure 2B:
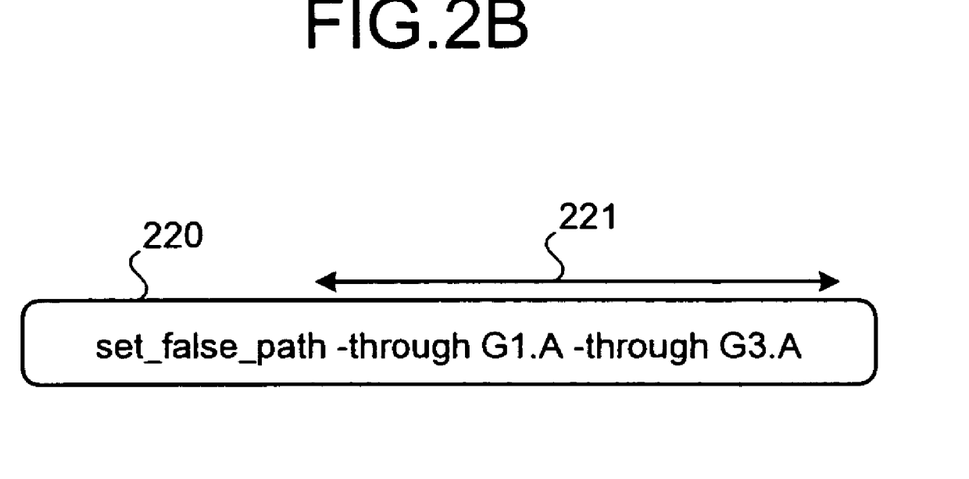

FIG. 2B is a schematic of description on a false path.

A description 220 on a false path is obtained by minimizing the through number of the description 210 on the target path 110 shown in FIG. 2A. Detailed process will be explained later in FIG. 5. Specifically, the description 220 is obtained by identifying the circuit elements G1 and G3 that cause the conflict in the target path 110 and deleting descriptions on circuit elements other than the identified circuit elements.

In other words, by forming the description 220 using circuit elements that cause a conflict, the description 210 can be expressed by the description 220 including "-through G1.A-through G3.A". With the description 220, the number of pieces of the description 210 and the data amount can be reduced as indicated by an arrow 221.

The description 220 including "-through G1.A-through G3.A" is a description on a path that passes through the input A of the circuit element G1 and the input A of the circuit element G3. In other words, the description 220 is a description that uniquely indicates a set of paths that pass through the input A of the circuit element G1 and the input A of the circuit element G3.

A path that passes through the input A of the circuit element G1 and the input A of the circuit element G3 has a conflict in transmitting a signal as shown in FIG. 1. Therefore, the description 220 indicates, as a description on the false path, not only the target path 110 but also paths that pass through the input A of the circuit element G1 and the input A of the circuit element G3 in the target circuit 100.

Figure 2C:
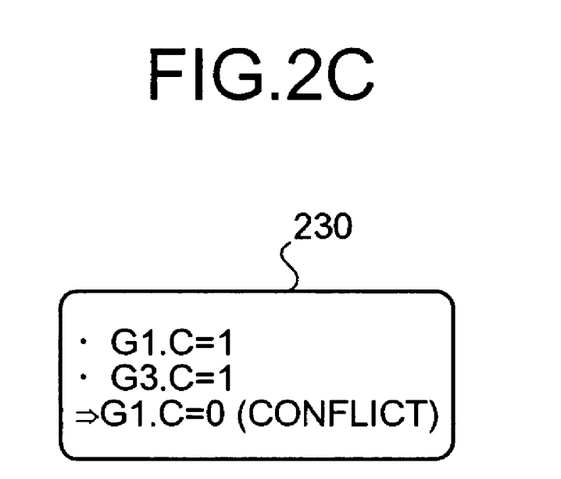

FIG. 2C is a schematic of a description on a proof of the false path. A description 230 on a proof of the false path includes a description on a proof of a conflict among the circuit elements included in the description 210.

Specifically, the description 230 includes the circuit elements G1 and G3 and the input signals of the circuit elements G1 and G3 identified in FIG. 2B. It also includes sequences of implied pairs of circuit elements and input signals starting from G1 and G3 to the conflict, when the circuit elements cause the conflict indirectly. When a signal is transmitted on the target path 110, the input signal from the input C of G1 shown in FIG. 1 is "1" and the input signal from the input C of G3 shown in FIG. 1 is "1". However, the description 230 indicates that a conflict occurs because the input signal from the input C of G1 should be "0" when the input signal from the input C of G3 is "1". In FIG. 2C, a right arrow indicates an implication relation.

The description 230 is not limited to the description shown, but may have a different configuration as long as any conflict can be checked.

As described above, the description 220 according to the embodiment of the present invention identifies circuit elements which cause the conflict when the target path 110 is a false path. The description 220 is formed by deleting, from the description 210, descriptions on circuit elements other than the identified circuit elements. Therefore, the number of pieces of descriptions can be minimized and reduction of the data amount can be realized.

Because the description 220 indicates a set of paths that pass through the circuit elements included in the description 220, the description 220 uniquely indicates plural false paths. Therefore, the number of pieces of descriptions on the false path and the data amount are reduced.

In the description 210 on the target path 110 detected as the false path, description on a proof of the false path is created from the description on the circuit elements whose input signals conflict. Therefore, a timing analysis can be executed effectively using the description on the false path.

Figure 3:
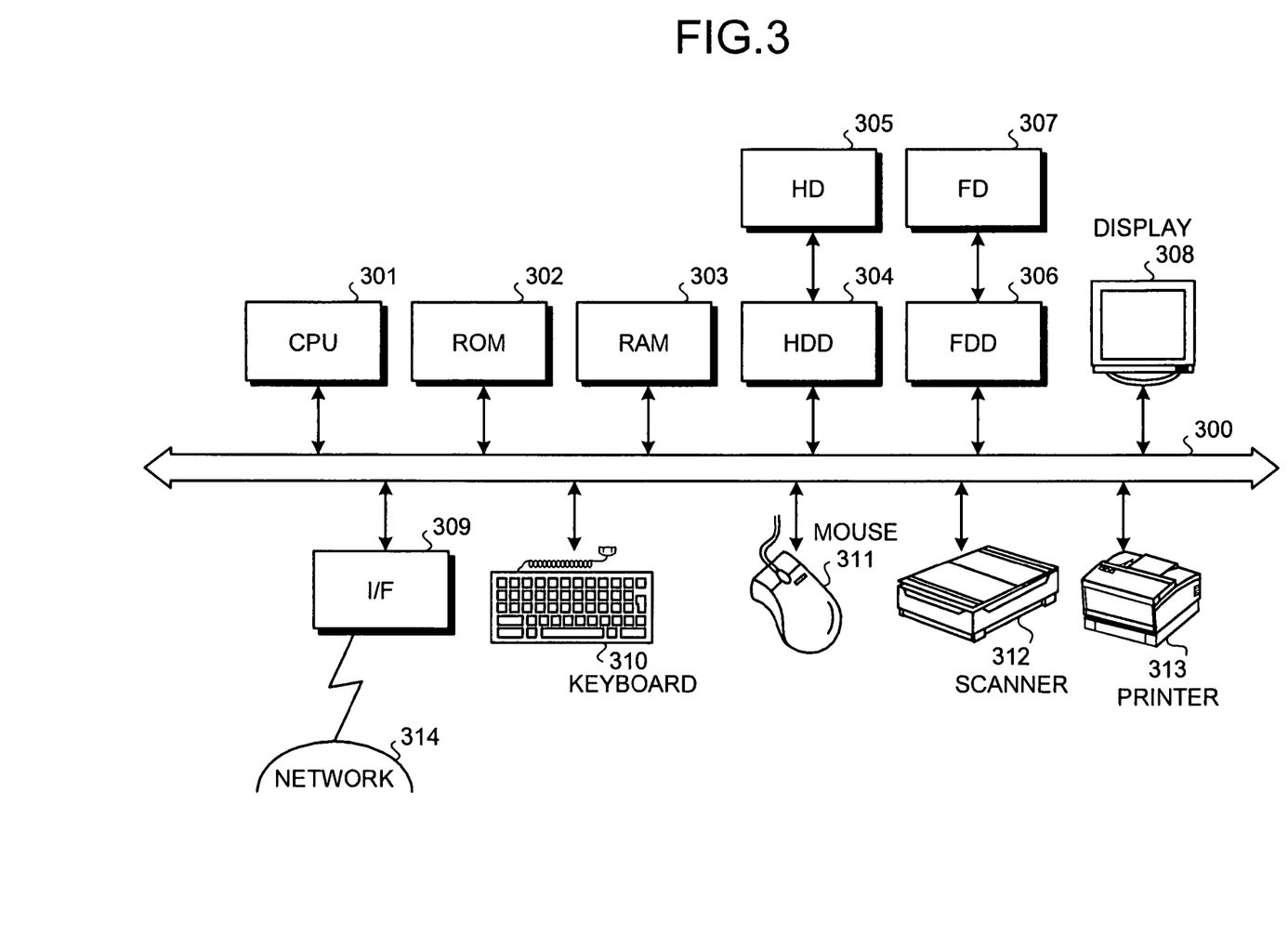
FIG. 3 is a schematic of an apparatus for creating a description on a false path.

FIG. 3 is a schematic of an apparatus for creating a description on a false path. An apparatus for creating a description on a false path includes a CPU 301, a ROM 302, a RAM 303, a hard disk drive (HDD) 304, a hard disk (HD) 305, a flexible disk drive (FDD) 306, a flexible disk (FD) 307 as an example of a removable recording medium, a display 308, an interface (I/F) 309, a keyboard 310, a mouse 311, a scanner 312, and a printer 313. Each component is connected via a bus 300 with each other.

The CPU 301 controls the entire apparatus. The ROM 302 stores programs such as a boot program, etc. The RAM is used by the CPU 301 as a work area. The HDD 304 controls reading/writing of data from/to the HD 305 in accordance with control of the CPU 301. The HD 305 stores data written in accordance with control of the HDD 304.

The FDD 306 controls reading/writing of data from/to the FD 307 in accordance with control of the CPU 301. The FD 307 stores the data written in accordance with control of the FDD 306, and causes the apparatus to read the data stored in the FD 307, etc.

As a removable recording medium, in addition to the FD 307, a compact-disc read-only memory (CD-ROM), a compact-disc recordable (CD-R), a compact-disc rewritable (CD-RW), a magneto optical (MO) disc, a digital versatile disc (DVD), and a memory card may be used. The display 308 displays not only a cursor, icons and tool boxes, but also data such as texts, images, functional information, etc. For example, a cathode-ray tube (CRT), a thin-film transistor (TFT) display, a plasma display, etc. may be employed as the display 308.

The I/F 309 is connected to a network 314 such as the Internet via a communication line and is connected to other devices via the network 314. The I/F 309 is an interface between the network 314 and the apparatus, and controls input/output of data from/to external devices. For example, a modem or a local area network (LAN) adaptor may be employed as the I/F 309.

The keyboard 310 includes keys to input letters, digits, various instructions, etc., and inputs data corresponding to the pressed keys into the apparatus. The keyboard 310 may be a touch-panel-type input pad or a numeric key pad, etc. Moving a cursor, selecting key range, moving a window and changing the size of a window may be executed by operating the mouse 311. The mouse 311 may be a track ball or a joy stick that includes a similar function as a pointing device.

The scanner 312 optically reads image information such as a document and captures the information as image data into the apparatus. The scanner 312 further has an optical character reader (OCR) function, and can read the description on the target path printed and convert the information into data. The printer 313 prints such as the description on the false path and the description on the cause of the false path. For example, a laser printer or an ink jet printer may be employed as the printer 313.

Figure 4:
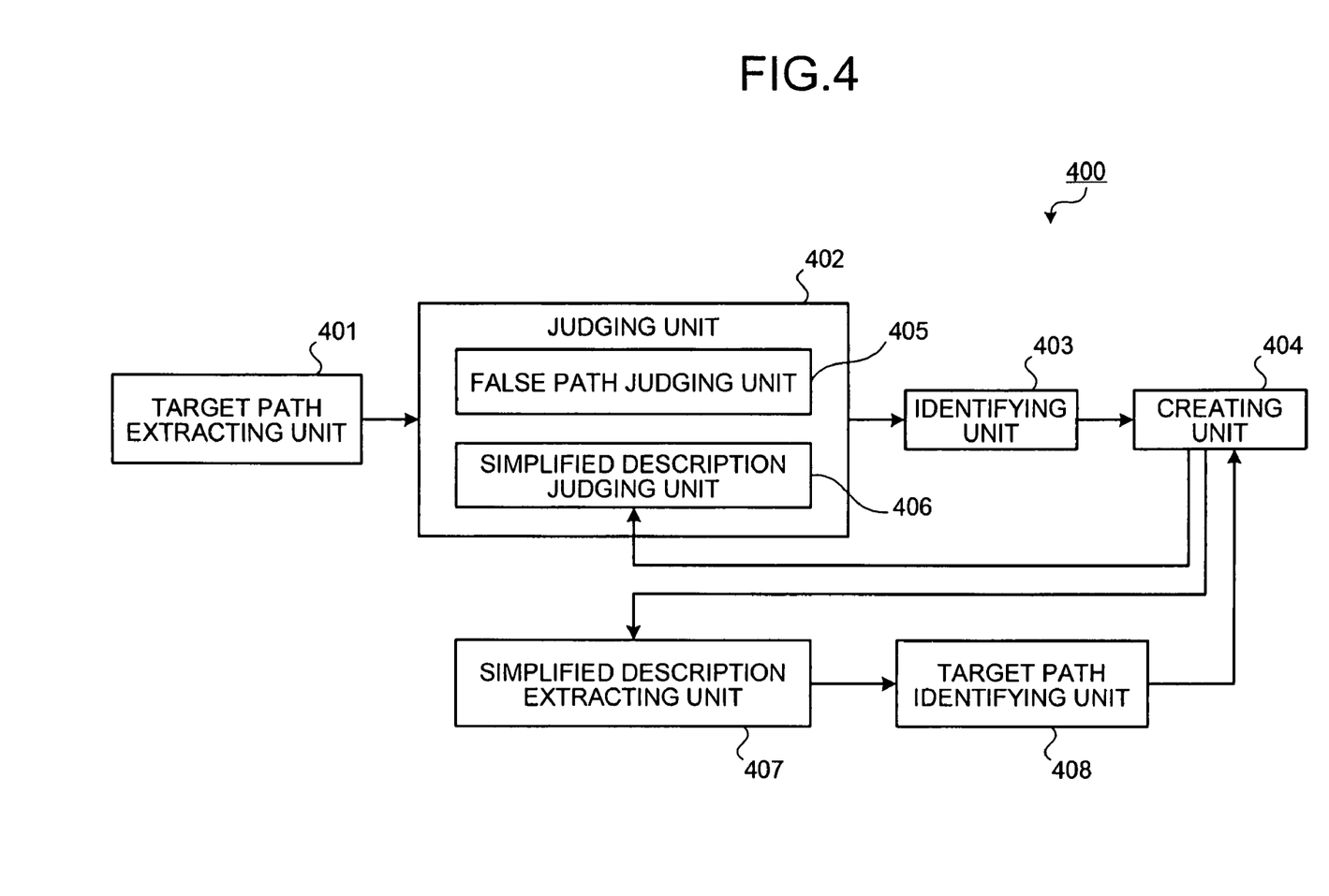
FIG. 4 is a block diagram of the apparatus for creating a description on a false path.

FIG. 4 is a block diagram of the apparatus for creating a description on a false path. An apparatus 400 for creating a description on a false path includes a target path extracting unit 401, a judging unit 402, an identifying unit 403, a creating unit 404, a simplified description extracting unit 407, and a target path identifying unit 408.

The target path extracting unit 401 extracts, from plural pieces of descriptions on paths in a target circuit that is the target of a timing analysis, a description on an arbitrary target path. The target path extracting unit 401 may extract a description on a target path repeatedly until analyses on all the paths in the target circuit are finished.

The judging unit 402 includes a false path judging unit 405 and a simplified description judging unit 406. The false path judging unit 405 judges whether the target path is a false path based on the description on the target path extracted by the target path extracting unit 401. How to judge whether the target path is a false path is a known technique, therefore, the detailed description thereof is omitted. However, for example, it is judged whether circuit elements on the target path extracted by the target path extracting unit 401 cause a conflict.

The identifying unit 403 identifies circuit elements that are the cause of the false path from the circuit elements included in the target path when it is judged by the false path judging unit 405 that the target path is a false path. The circuit elements that are the cause of the false path are the circuit elements whose input signals imply a conflict directly or indirectly.

The creating unit 404 creates a description on the false path by deleting descriptions on circuit elements other than the circuit elements identified by the identifying unit 403 (hereinafter, "the identified circuit elements") from the description on the target path.

Moreover, the creating unit 404 creates a simplified description formed by converting the description on the false path into a description on the identified circuit elements whose input signals imply a conflict directly or indirectly.

Specifically, as shown in FIGS. 2A and 2B, the creating unit 404 creates the description 220 on the false path by minimizing the through number of the description 210 on the target path 110. When plural combinations of the identified circuit elements are found in the description 210, plural pieces of simplified descriptions are created for the false path.

The creating unit 404 deletes, from pieces of the simplified descriptions on each target path, every description on the target paths identified by a target path identifying unit 408 described later.

The creating unit 404 further creates a description on a proof of a false path based on the description on the identified circuit elements whose input signals conflict. Specifically, as shown in FIG. 2C, the description on the proof includes the identified circuit elements that cause a conflict, and the input signals of the identified circuit elements. It also includes sequences of implied pair of circuit elements and input signals, starting from the identified circuit elements to the conflict. A false path can be efficiently and easily verified using the description on the proof of the false path.

The simplified description judging unit 406 judges whether any simplified description created by the creating unit 404 is included in a description on a new target path extracted by the target path extracting unit 401. Note that when a description A is included in a description B, the set of paths specified by A is included in the set of paths specified by B. The false path judging unit 405 judges whether the new target path is a false path based on a result of the simplified description judging unit 406.

Specifically, the false path judging unit 405 does not judge whether the new target path is a false path when it is judged by the simplified description judging unit 406 that any simplified description created so far is included in the description of the new target path.

On the other hand, the false path judging unit 405 judges whether the new target path is a false path when it is judged by the simplified description judging unit 406 that no simplified description created so far is included.

In other words, because a simplified description on a set of the identified circuit elements represents a set of paths that pass through the identified circuit elements that cause a conflict, the target path including the identified circuit elements can be judged as a false path without being judged by the false path judgment unit 405. Therefore, a higher speed of the processing can be realized.

The simplified description extracting unit 407 extracts a simplified description on an arbitrary target path from pieces of the simplified descriptions on each target path created by the creating unit 404. Though the details will be described later in FIGS. 7 and 8, a most common simplified description in target paths may be extracted by the simplified description extracting unit 407.

The target path identifying unit 408 identifies every target path having a simplified description same as the simplified description extracted by the simplified description extracting unit 407, from pieces of the descriptions on target paths other than the target path having the simplified description extracted by the simplified description extracting unit 407.

The target path extracting unit 401, the judging unit 402, the identifying unit 403, the creating unit 404, the simplified description extracting unit 407, and the target path identifying unit 408 shown in FIG. 4 can be actualized by causing the CPU 301 to execute programs stored in a recording medium such as the ROM 302, the RAM 303, and the HD 305 or by the I/F 309, the key board 310, and the mouse 311 shown in FIG. 3.

Figure 5:
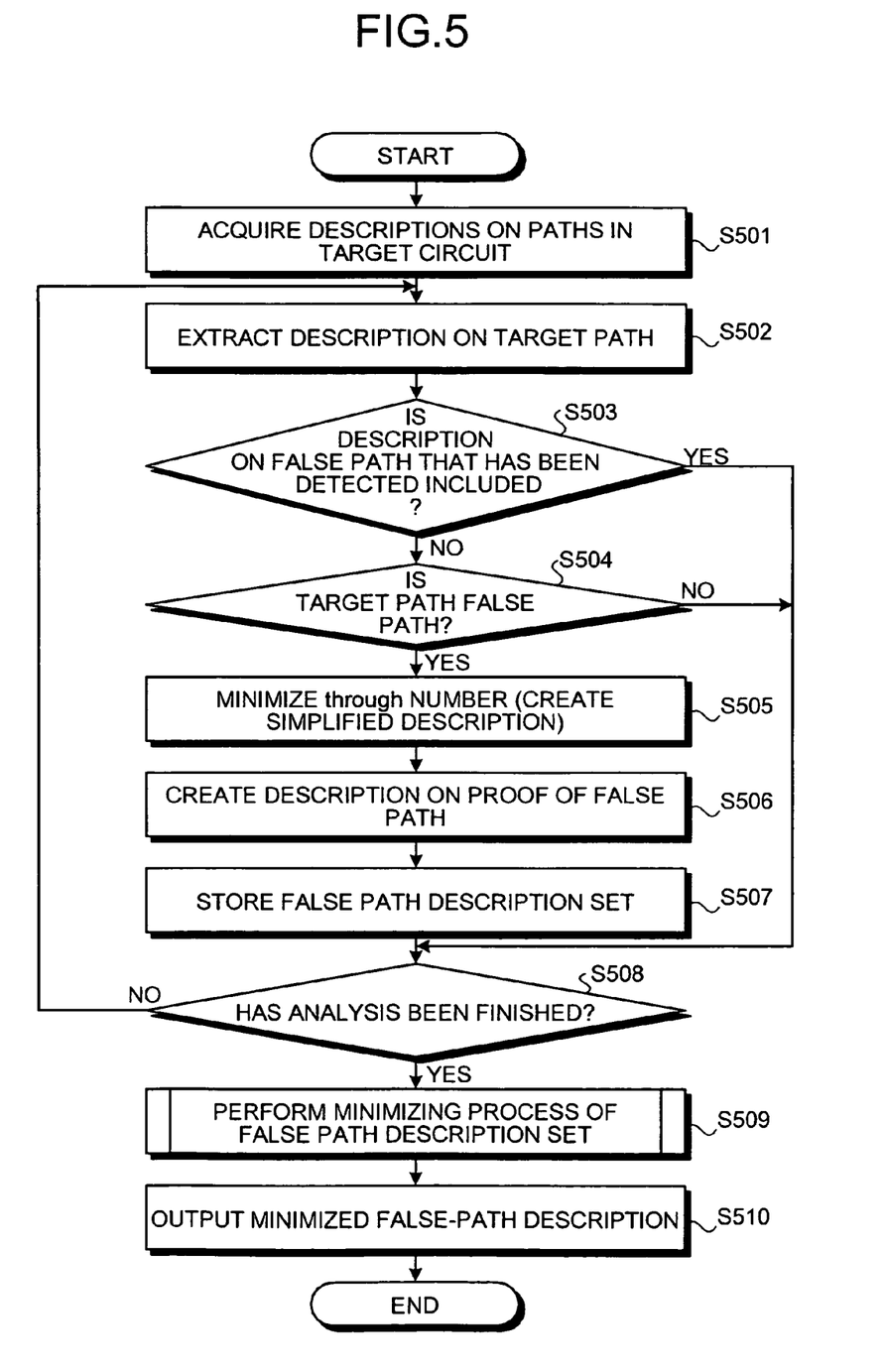
FIG. 5 is a flowchart of a process of creating a description on a false path performed by the apparatus for creating a description on a false path.

FIG. 5 is a flowchart of a process of creating a description on a false path performed by the apparatus for creating a description on a false path.

The apparatus 400 for creating a description on a false path acquires descriptions on paths in the target circuit (step S501). A description on a path may be stored in a recording medium such as the HD 305 and the FD 307. A description on a path may be acquired from an external source via the I/F 309.

The target path extracting unit 401 extracts a description on a target path from the descriptions acquired at step S501 (step S502).

The simplified description judging unit 406 judges whether a description on a false path that has been detected is included in the description on the target path extracted at step S502 (step S503). The description on the false path already detected may be a simplified description on identified circuit elements that cause a conflict as described above in FIG. 4. At step S503, descriptions on false paths that have more than one simplified description in false path description set are skipped.

When the description on the false path already detected is included in the description on the target path extracted at step S502 (step S503: YES), the process is advanced to step S508 and it is judged whether an analysis for the descriptions on the paths in the target circuit acquired at step S501 has been finished (step S508).

On the other hand, when no description on the false path already detected is included in the description on the target path extracted at step S502 (step S503: NO), the false path judging unit 405 judges whether the target path is a false path (step S504).

How to judge whether the target path is a false path is a known technique, therefore, detailed description thereof is omitted. However, it is judged whether input signals for circuit elements in the description on the target path extracted at step S502 have a conflict.

When it is judged that the target path is not a false path (step S504: NO), the process is advanced to step S508 and it is judged whether the analysis for the descriptions on the paths in the target circuit has been finished (step S508).

On the other hand, when it is judged that the target path is a false path (step S504: YES), the identifying unit 403 identifies circuit elements whose input signals conflict and the creating unit 404 minimizes the through number of the description on the target path (step S505).

Specifically, the identifying unit 403 identifies circuit elements whose input signals conflict in a description such as the description 210 on the target path 110 detected as a false path shown in FIGS. 2A and 2B. Then, the creating unit 404 creates a simplified description by deleting the description on circuit elements other than the identified circuit elements. Though this process is described as "minimize through number" as shown in FIG. 5, the description of "through" may be omitted in the simplified description.

The creating unit 404 creates a description on a proof of the false path using the simplified description (step S506). A false path description set on false paths including the simplified descriptions created at step S505 is stored by a storage unit not shown (step S507).

Then, it is judged whether the analysis for the descriptions on the paths in the target circuit acquired at step S501 has been finished (step S508). When the analysis has not been finished (step S508: NO), the process is repeated from step S502.

On the other hand, when the analysis has been finished (step S508: YES), the creating unit 404 performs a minimizing process of the false path description set stored at step S507 (step S509).

The details of the minimizing process will be described later in FIG. 9. However, the creating unit 404 deletes a simplified description same as the simplified description on the target path identified by the target path identifying unit 408 from pieces of the simplified descriptions on each target path included in the false path description set stored at step S507.

An output unit not shown outputs the minimized false-path description created at step S509 (step S510) and a series of processes is finished. The description on the proofs of the false paths created at step S506 may be output with the minimized false-path description, or may be output to an external device via the I/F 309, or may be printed by the printer 313.

Figure 6:
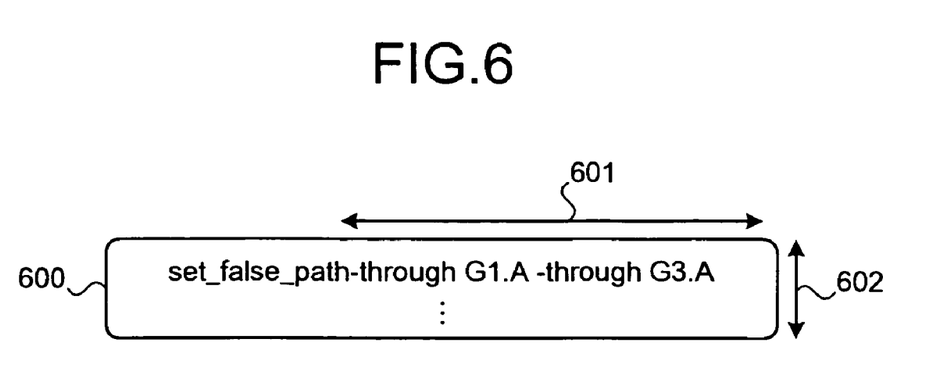
FIG. 6 is a schematic of a false path description set after a minimizing process.

FIG. 6 is a schematic of the false path description set after the minimizing process. A minimized false-path description 600 is formed by deleting a simplified description same as the simplified description on the target path identified by the target path identifying unit 408 from the simplified descriptions on target paths stored as the false path description set.

Though the details will be described later in FIGS. 7 and 8, the number of pieces of descriptions and the data amount can be reduced as indicated by an arrow 601 by changing the description on the target path into the simplified description. The number of pieces of descriptions and the data amount can be reduced as indicated by an arrow 602 by deleting a simplified description same as the simplified description on the identified target path form pieces of the simplified descriptions.

Figure 7:
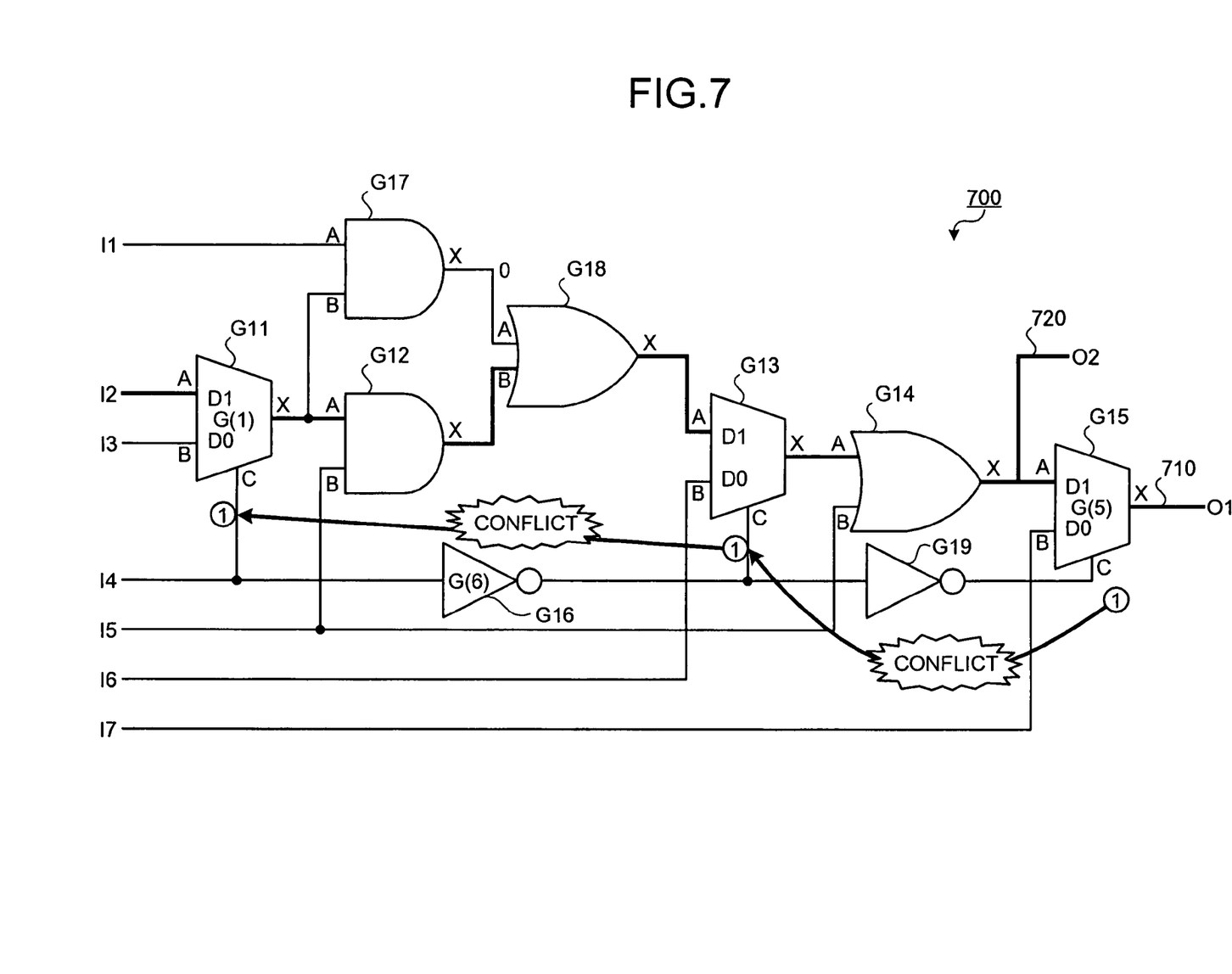
FIG. 7 is a schematic of a target circuit for which the minimizing process of the false path description set is performed.

FIG. 7 is a schematic of a target circuit for which the minimizing process of the false path description set is performed. A target circuit 700 includes circuit elements G11, G12, G13, G14, G15, G16, G17, G18, and G19.

The circuit elements G11, G13, and G15 are multiplexers shown in FIGS. 1 and 10 and are elements that switch paths based on an input signal. Specifically, a path from an input A is selected to D1 when an input signal from an input C is "1" and a path from an input B is selected to D0 when an input signal from the input C is "0".

The circuit elements G12 and G17 are AND gates and are logic gates having functions of logical multiplication, respectively. Specifically, the circuit elements G12 and G17 are elements that set an output signal of "1" to the output X when input signals from the inputs A and B are both "1". In other words, the circuit elements G12 and G17 are elements that set an output signal of "0" to the output X when at least any one of input signals from the input A and the input B is "0".

The circuit elements G14 and G18 are OR gates and are logic gates having functions of logical addition, respectively. Specifically, the circuit elements G14 and G18 are elements that set an output signal of "1" to the output X when at least any one of input signals from the input A and the input B is "1". In other words, the circuit elements G14 and G18 are elements that set an output signal of "0" to the output X when input signals from the input A and the input B are both "0".

The circuit elements G16 and G19 are NOT gates and are logic gates having functions of an inverter that inverts an input signal, respectively. Specifically, the circuit elements G16 and G19 respectively set an output signal of "1" when an input signal is "0" and set an output signal of "0" when an input signal is "1".

Target paths 710 and 720 indicated by thick lines in the target circuit 700 are false paths on which no combination of inputs that transmits a signal is present. The target path 710 is a path from an input 12 to an output 02, and consists of a description including "I2-G11-G12-G18-G13-G14-G15-O1". In the same way as the target path 710, the target path 720 consists of a description including "I2-G11-G12-G18-G13-G14-O2".

The target path 710 is a false path including G11, G13, and G15 as identified circuit elements. The target path 720 is a false path including G11 and G13 as identified circuit elements.

Specifically, G11 causes the input A to pass through when an input signal from the input C of G11 is "1". However, an input signal from the input C of G13 is "0" due to G16 that is a NOT gate. Therefore, G13 does not cause the input A to pass through.

When an input signal from the input C of G13 is "1", G13 causes the input A to pass through. However, an input signal from the input C of G11 is "0" due to G16 that is a NOT gate. Therefore, G11 does not cause the input A to pass through. Thus, no combination of inputs for transmitting a signal is present for G11 and G13, and the circuit elements cause a conflict between the input signals.

Similarly, no combination of inputs for transmitting a signal is present for G13 and G15 due to G19 that is a NOT gate, and the circuit elements cause a conflict between the input signals.

Figure 8:
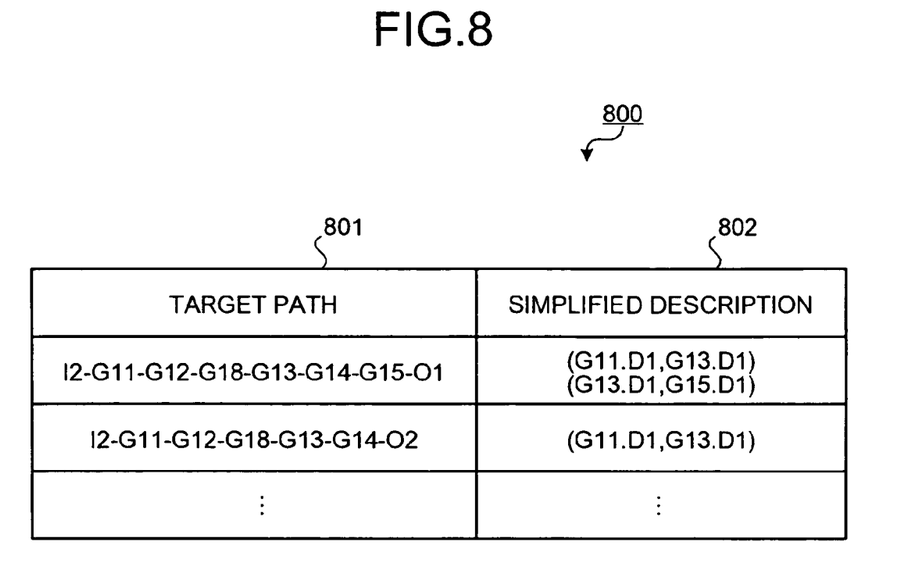
FIG. 8 is a schematic of the false path description set.

FIG. 8 is a schematic of the false path description set. In a false path description set 800, target paths in a target path column 801 and simplified descriptions on target paths in a simplified description column 802 are correlated.

Specifically, when the target paths 710 and 720 shown in FIG. 7 are used, the target path 710 shown in the target path column 801 has a description including "I2-G11-G12-G18-G13-G14-G15-O1". The simplified description including (G11.D1, G13.D1) and (G13.D1, G15.D1) is shown in the simplified description column 802 corresponding to the target path 710 due to the identified circuit elements that cause conflicts.

The target path 720 shown in the target path column 801 has a description including "I2-G11-G12-G18-G13-G14-O2". The simplified description including (G11.D1, G13.D1) is shown in the simplified description column 802 corresponding to the target path 720 due to the identified circuit elements that cause a conflict.

Figure 9:
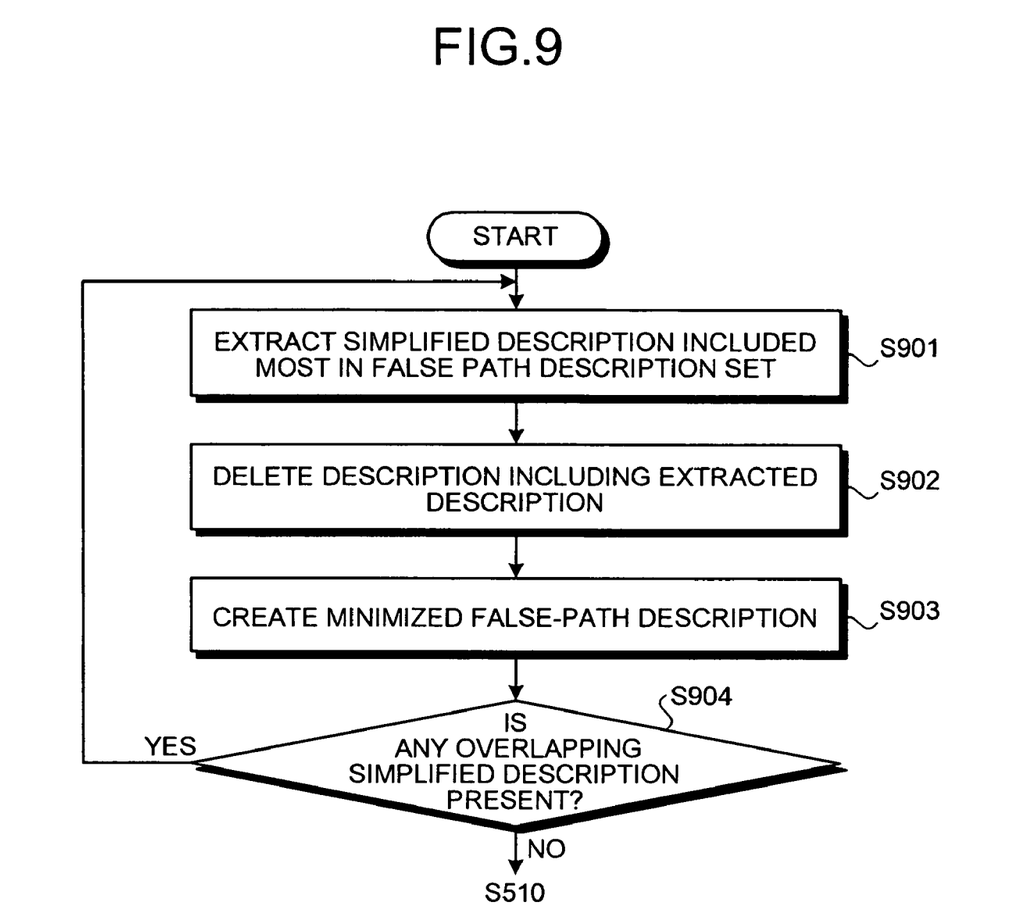
FIG. 9 is a flowchart of a minimizing process of the false path description set shown in FIG. 5.

FIG. 9 is a flowchart of the minimizing process (step S509 of FIG. 5) of the false path description set. The simplified description extracting unit 407 extracts, from the false path description set stored at step S507 of FIG. 5, a simplified description that is included therein the most (step S901).

Specifically, the simplified description extracting unit 407 extracts the simplified description (G11.D1, G13.D1) for the target path 710, because it is included most in the false path description set 800 shown in FIG. 8.

The creating unit 404 deletes descriptions including the simplified description extracted at step S901 (step S902). Note that the extracted simplified description is, for example, (G11.D1, G13.D11) for the target path 710. Thus, the creating unit 404 creates the minimized false-path description (step S903).

Specifically, the creating unit 404 deletes, from the description on the target path 710 and the description on the target path 720 that include the simplified description (G11.D1, G13.D1), the simplified description (G13.D1, G15.D1) correlated with the target path 710, the description on the target path 720, and the simplified description (G11.D1, G13.D1) correlated with the target path 720, respectively.

Whether any overlapping simplified description is present in the false path description set stored at step S507 of FIG. 5 is judged (step S904). When an overlapping simplified description is present (step S904: YES), the process is repeated from step S901.

On the other hand, when no overlapping simplified description is present (step S904: NO), the minimizing process is finished and the process is advanced to step S510.

According to the embodiment of the present invention, when a target path in a target circuit is a false path, a simplified description including identified circuit elements that is a cause of the false path is created from a description on the false path. Therefore, the number of pieces of descriptions can be reduced and the data amount can be reduced compared with a description including all the circuit elements of the target path.

According to the embodiment of the present invention, when a description on a target path includes a simplified description already created, judgment of whether the target path is a false path is not executed. Therefore, the analysis of paths in the target circuit can be quickly and efficiently performed.

According to the embodiment of the present invention, the data amount can be reduced by deleting, from the false path description set including plural pieces of simplified descriptions, the same simplified descriptions to make the minimized false-path description. Therefore, reduction of a period for designing by design engineers and reduction of a load on design engineers can be realized.

According to the embodiment of the present invention, a check of false paths using the minimized false-path description can be easily executed because a description on a minimum proof of the false path is created. Therefore, the check of descriptions on false paths by design engineers is simplified and reduction of a period for designing and reduction of a load can be realized.

According to the embodiments described above, reduction of a period for designing and reduction of a load on design engineers can be facilitated by efficiently creating a proper description on a false path.

The method of creating descriptive information on a false path described in the embodiment can be realized by executing a program prepared in advance on a computer such as a personal computer, a work station. This program is recorded in a computer-readable recording medium such as a HD, a FD, a CD-ROM, an MO, and a DVD, and is executed by being read from the recording medium by the computer. This program may be a transmission medium distributable via a network such as the Internet.

According to the embodiments described above, reduction of a period for designing and reduction of a load on design engineers can be facilitated.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A computer-readable recording medium that stores therein a computer program for creating a simplified false-path description on a false path among a plurality of paths in a target circuit, the computer program causing a computer to execute:
   extracting, from a plurality of descriptions on the paths, a target path description on a target path;
   judging whether the target path is a false path based on the target path description;
   identifying, when it is judged that the target path is a false path, a sufficient set of elements from a plurality of elements included in the target path, wherein settings for causing every element in the sufficient set to transmit a signal conflict; and
   creating the simplified false-path description on the false path by deleting, from the target path description, descriptions on elements that are not included in the sufficient set.

2. The computer-readable recording medium according to claim 1, wherein:
   the extracting includes extracting a new target path description on a new target path from the descriptions; and
   the judging includes judging whether the new target path is a false path based on whether all the elements in the sufficient set are included in the new target path description.

3. The computer-readable recording medium according to claim 1, wherein
   the creating includes creating a plurality of simplified false-path descriptions including at least a first simplified false-path description and a second simplified false-path description, and
   the computer program further causes the computer to execute:
      judging whether the first simplified false-path description is identical to the second simplified false-path description; and
      deleting, when it is judged that the first simplified false-path description is identical to the second simplified false-path description, either one of the first simplified false-path description and the second simplified false-path description.

4. The computer-readable recording medium according to claim 1, wherein
   the simplified false-path description includes a description on a proof of a conflict among the elements in the sufficient set.

5. An apparatus that creates a simplified false-path description on a false path among a plurality of paths in a target circuit, the apparatus comprising:
   an extracting unit that extracts, from a plurality of descriptions on the paths, a target path description on a target path;
   a first judging unit that judges whether the target path is a false path based on the target path description;
   an identifying unit that identifies, when it is judged that the target path is a false path, a sufficient set of elements from a plurality of elements included in the target path, wherein settings for causing every element in the sufficient set to transmit a signal conflict; and
   a creating unit that creates the simplified false-path description on the false path by deleting, from the target path description, descriptions on elements that are not included in the sufficient set.

6. The apparatus according to claim 5, wherein:
the extracting unit extracts a new target path description on a new target path from the descriptions; and
the first judging unit judges whether the new target path is a false path based on whether all the elements in the sufficient set are included in the new target path description.

7. The apparatus according to claim 5, wherein
the creating unit creates a plurality of simplified false-path descriptions including at least a first simplified false-path description and a second simplified false-path description, and
the apparatus further comprises:
a second judging unit that judges whether the first simplified false-path description is identical to the second simplified false-path description; and
a deleting unit that deletes, when it is judged that the first simplified false-path description is identical to the second simplified false-path description, either one of the first simplified false-path description and the second simplified false-path description.

8. The apparatus according to claim 5, wherein
the simplified false-path description includes a description on a proof of a conflict among the elements in the sufficient set.

9. A method of creating a simplified false-path description on a false path among a plurality of paths in a target circuit, the method comprising:
extracting, from a plurality of descriptions on the paths, a target path description on a target path;
judging whether the target path is a false path based on the target path description;
identifying, when it is judged that the target path is a false path, a sufficient set of elements from a plurality of elements included in the target path, wherein settings for causing every element in the sufficient set to transmit a signal conflict; and
creating the simplified false-path description on the false path by deleting, from the target path description, descriptions on elements that are not included in the sufficient set.

10. The method according to claim 9, wherein
the extracting includes extracting a new target path description on a new target path from the descriptions, and
the judging includes judging whether the new target path is a false path based on whether all the elements in the sufficient set are included in the new target path description.

11. The method according to claim 9, wherein
the creating includes creating a plurality of simplified false-path descriptions including at least a first simplified false-path description and a second simplified false-path description, and
the method further comprises:
judging whether the first simplified false-path description is identical to the second simplified false-path description; and
deleting, when it is judged that the first simplified false-path description is identical to the second simplified false-path description, either one of the first simplified false-path description and the second simplified false-path description.

12. The method according to claim 9, wherein
the simplified false-path description includes a description on a proof of a conflict among the elements in the sufficient set.

* * * * *